United States Patent
Kehtarnavaz et al.

(10) Patent No.: US 10,432,842 B2
(45) Date of Patent: Oct. 1, 2019

(54) FUSION OF INERTIAL AND DEPTH SENSORS FOR MOVEMENT MEASUREMENTS AND RECOGNITION

(71) Applicant: THE TEXAS A&M UNIVERSITY SYSTEM, College Station, TX (US)

(72) Inventors: Nasser Kehtarnavaz, Plano, TX (US); Roozbeh Jafari, University Park, TX (US); Kui Liu, Dallas, TX (US); Chen Chen, Richardson, TX (US); Jian Wu, Richardson, TX (US)

(73) Assignee: THE TEXAS A&M UNIVERSITY SYSTEM, College Station, TX (US)

( * ) Notice: Subject to any disclaimer, the term of this patent is extended or adjusted under 35 U.S.C. 154(b) by 324 days.

(21) Appl. No.: 15/092,347

(22) Filed: Apr. 6, 2016

(65) Prior Publication Data
US 2016/0292497 A1    Oct. 6, 2016

Related U.S. Application Data

(60) Provisional application No. 62/143,331, filed on Apr. 6, 2015.

(51) Int. Cl.
G06K 9/00      (2006.01)
H04N 5/232     (2006.01)
G06K 9/62      (2006.01)

(52) U.S. Cl.
CPC ......... *H04N 5/232* (2013.01); *G06K 9/00355* (2013.01); *G06K 9/6278* (2013.01); *G06K 9/6292* (2013.01); *G06K 9/6297* (2013.01)

(58) Field of Classification Search
CPC .. H04N 5/232; G06K 9/00355; G06K 9/6278; G06K 9/6292; G06K 9/6297
USPC ................................................... 702/152, 141
See application file for complete search history.

(56) References Cited

U.S. PATENT DOCUMENTS

| | | | | |
|---|---|---|---|---|
| 2010/0225746 A1* | 9/2010 | Shpunt | ............... | G01B 11/2518 348/50 |
| 2010/0290674 A1* | 11/2010 | Kim | ........................ | G01S 17/89 382/106 |
| 2011/0115886 A1* | 5/2011 | Nguyen | .................. | G06T 5/003 348/47 |
| 2011/0143811 A1* | 6/2011 | Rodriguez | ......... | G06K 9/00986 455/556.1 |
| 2014/0009382 A1* | 1/2014 | Chou | ...................... | G06F 3/017 345/156 |
| 2015/0254510 A1* | 9/2015 | McKinnon | ........ | G06F 17/30244 382/103 |

* cited by examiner

*Primary Examiner* — Dzung Tran
(74) *Attorney, Agent, or Firm* — Conley Rose, P.C.

(57) ABSTRACT

A movement recognition system includes an inertial sensor, a depth sensor, and a processor. The inertial sensor is coupled to an object and configured to measure a first unit of inertia of the object. The depth sensor is configured to measure a three dimensional shape of the object using projected light patterns and a camera. The processor is configured to receive a signal representative of the measured first unit of inertia from the inertial sensor and a signal representative of the measured shape from the depth sensor and to determine a type of movement of the object based on the measured first unit of inertia and the measured shape utilizing a classification model.

9 Claims, 7 Drawing Sheets

FUSION OF INERTIAL AND DEPTH SENSORS FOR MOVEMENT MEASUREMENTS AND RECOGNITION

CROSS-REFERENCE TO RELATED APPLICATIONS

This application claims benefit of U.S. Provisional Application Ser. No. 62/143,331 filed Apr. 6, 2015, and entitled "Fusion of Inertial and Depth Sensors for Body Movement Measurements and Recognition," which is hereby incorporated herein by reference in its entirety.

BACKGROUND

Depth sensors or inertial body sensors have been used for measurement or recognition of human body movements spanning various applications including healthcare rehabilitation and consumer electronics entertainment applications. Each of the above two sensors has been used individually for body movement measurements and recognition. However, each sensor has limitations when operating under real world conditions.

The application of depth sensors has been steadily growing for body movement measurements and recognition. For example, depth images captured by depth sensors have been used to recognize American Sign Language (ASL). Depth sensors typically utilize one of two major matching techniques for gesture recognition including: Dynamic Time Warping (DTW) and Elastic Matching (EM). Statistical modeling techniques, such as particle filtering and Hidden Markov model (HMM), have also been utilized for gesture recognition utilizing a depth sensor alone.

Inertial body sensors have also been utilized to recognize body movement measurements and recognition. For example, the human motion capture system may utilize wireless inertial sensors. Wireless body sensors have been utilized to recognize the activity and position of upper trunk and lower extremities. A support vector machine (SVM) classifier has been used to estimate the severity of Parkinson disease symptoms. Furthermore, Kalman filtering has been used to obtain orientations and positions of body limbs. However, the use of inertial body sensors with depth sensors at the same time and together to increase system recognition robustness has not been well developed.

SUMMARY

The problems noted above are solved in large part by systems and methods for recognizing and/or measuring movements utilizing both an inertial sensor and a depth sensor. In some embodiments, a movement recognition system includes an inertial sensor, a depth sensor, and a processor. The inertial sensor is coupled to an object and configured to measure a first unit of inertia of the object. The depth sensor is configured to measure a three dimensional shape of the object using projected light patterns and a camera. The processor is configured to receive a signal representative of the measured first unit of inertia from the inertial sensor and a signal representative of the measured shape from the depth sensor and to determine a type of movement of the object based on the measured first unit of inertia and the measured shape utilizing a classification model.

Another illustrative embodiment is a method of recognizing movement of an object. The method comprises measuring, by an inertial sensor, a first unit of inertia of an object. The method also comprises measuring a three dimensional shape of the object. The method also comprises receiving, by a processor, a signal representative of the measured first unit of inertia from the inertial sensor and a signal representative of the measured shape from the depth sensor. The method also comprises determining a type of movement of the object based on the measured first unit of inertia and the measured shape utilizing classification model.

Yet another illustrative embodiment is a non-transitory computer-readable medium. The non-transitory computer-readable medium stores instructions that when executed on a computing system cause the computing system to receive a signal representative of a measured first unit of inertia from an inertial sensor coupled to an object and a signal representative of a measured shape of the object from a depth sensor and determine a type of movement of the object based on the measured first unit of inertia and the measured shape utilizing a classification model.

BRIEF DESCRIPTION OF THE DRAWINGS

For a detailed description of various examples, reference will now be made to the accompanying drawings in which.

NOTATION AND NOMENCLATURE

Certain terms are used throughout the following description and claims to refer to particular system components. As one skilled in the art will appreciate, entities and/or individuals may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . " Also, the term "couple" or "couples" is intended to mean either an indirect or direct connection. Thus, if a first device couples to a second device, that connection may be through a direct connection, or through an indirect connection via other devices and connections. The recitation "based on" is intended to mean "based at least in part on." Therefore, if X is based on Y, X may be based on Y and any number of other factors.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

As discussed above, both depth sensors and inertial body sensors have been utilized individually to recognize body movements. However, each of these systems has limitations. It is therefore desirable to create a general purpose fusion framework to increase the robustness of object movement recognition by utilizing the information from two or more sensors at the same time. Therefore, in accordance with the disclosed principles two sensors, one a depth sensor and one an inertial sensor, are deployed in such a way that they act in a complementary manner by compensating for erroneous data that may be generated by each sensor individually.

Figure 1:
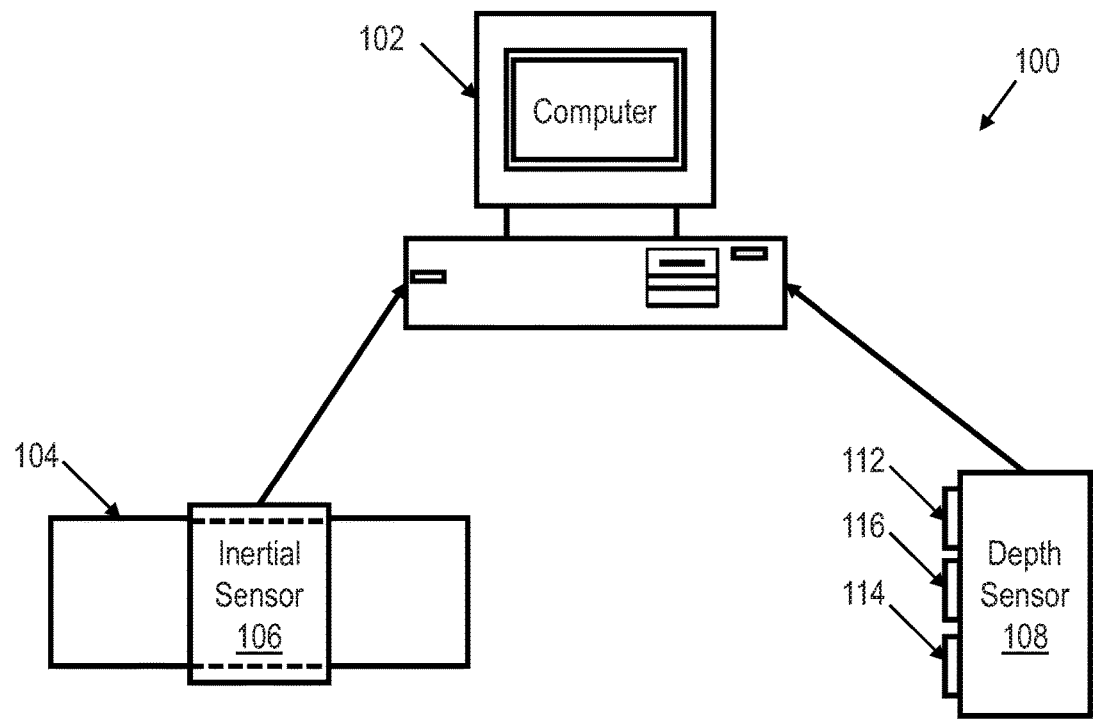
FIG. 1 shows an illustrative block diagram of a movement recognition system utilizing an inertial sensor and a depth sensor in accordance with various embodiments.

FIG. 1 shows an illustrative block diagram of a movement recognition system 100 utilizing an inertial sensor 106 and a depth sensor 108 in accordance with various embodiments. The movement recognition system 100 may include computer system 102, inertial sensor 106, and depth sensor 108. Computer system 102 may include computer hardware that may execute instructions stored in computer system 102 or stored in another computer system and/or memory connected to computer system 102. While shown as a desktop computer, computer system 102 may be any electronic device having some amount of computing power. Among other things, servers, portable computers, personal digital assistants (PDAs), and mobile phones may be configured to carry out aspects of the disclosed embodiments. In some embodiments, computing system 102 may include several computers and components that are interconnected via communication links, using one or more computer networks or direct connections.

Inertial sensor 106 may be any type of inertial sensor that may measure information corresponding to an object's inertial movement, sometimes referred to as a unit of inertia (i.e., specific force, acceleration, angular rate, pitch, roll, yaw, and/or magnetic field). Thus, inertial sensor 106 may be an accelerometer, a gyroscope, a magnetometer, or any combination thereof. For example, inertial sensor 106 may include both an accelerometer and a gyroscope. In an alternative example, inertial sensor 106 may include only an accelerometer. In some embodiments, inertial sensor 106 is a micro-electro-mechanical system (MEMS). In an embodiment, the inertial sensor 106 includes a 9-axis MEMS sensor which captures 3-axis acceleration, 3-axis angular velocity, and 3-axis magnetic strength data.

Inertial sensor 106 may be coupled to an object 104 to measure the object 104's inertial movement. For example, inertial sensor 106 may be coupled to object 104 to measure object 104's acceleration and angular rate. Object 104 may be any type of object including animate objects such as a human wrist or any other human body part. For example, inertial sensor 106 may be coupled to the wrist of a human such that the inertial sensor 106 measures inertial movement of the human's wrist.

The inertial sensor 106 may be wirelessly and/or wireline coupled to computer system 102. For example, inertial sensor 106 may be configured to communicate data to computer system 102 through a network based on the IEEE 802.15.4e standard, a wireless local area network ("WLAN"), such as network based on the IEEE 802.11 standard, and/or a wireless personal area network ("WPAN") (e.g., a BLUETOOTH network). Thus, inertial sensor 106 may communicate a signal and/or signals to computer system 102 representative of the inertial measurements of object 104.

Depth sensor 108 may be configured to measure a three dimensional shape of object 104 utilizing projected light patterns and a camera. Therefore, depth sensor 108 may include an infrared (IR) emitter 112, a camera (in some embodiments, a color camera) 116, and an IR depth sensor 114. Thus, depth sensor 108 may capture a series of depth images of object 104 as object 104 changes position. In some embodiments, to measure the three dimensional shape of object 104, depth sensor 108 may capture more than thirty frames per second of object 104. In some embodiments, the depth sensor 108 may be a MICROSOFT KINNECT.

The depth sensor 106 may be wirelessly and/or wireline coupled to computer system 102. For example, depth sensor 108 may be configured to communicate data to computer system 102 through a network based on the IEEE 802.15.4e standard, a wireless local area network ("WLAN"), such as network based on the IEEE 802.11 standard, and/or a wireless personal area network ("WPAN") (e.g., a BLUETOOTH network). Thus, depth sensor 108 may communicate a signal and/or signals to computer system 102 representative of the measured shape of object 104.

Figure 2:
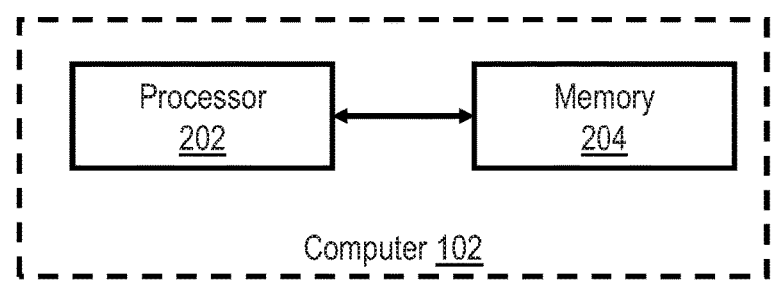
FIG. 2 shows an illustrative block diagram of a computer in a movement recognition system utilizing an inertial sensor and a depth sensor in accordance with various embodiments.

FIG. 2 shows an illustrative block diagram of computer system 102 of movement recognition system 100 in accordance with various embodiments. The computer system 102 includes one or more processors 202 that may be configured to receive the signals representative of the inertial measurements of object 104 from inertial sensor 106 and the signals representative of the measured shape of object 104 from depth sensor 108. Processor 202 may be coupled to system memory 204 via an input/output interface. Processor 202 may include a central processing unit (CPU), a semiconductor-based microprocessor, a graphics processing unit (GPU), and/or other hardware devices suitable for retrieval and execution of instructions that may be stored in memory 204 or other memory.

Processor 202 may include a single processor, multiple processors, a single computer, a network of computers, or any other type of processing device. For example, processor 202 may include multiple cores on a chip, multiple cores across multiple chips, multiple cores across multiple devices, or combinations thereof. Processor 202 may include at least one integrated circuit (IC), other control logic, other electronic circuits, or combinations thereof that include a number of electronic components. Processor 202 may perform operations such as graphics, signal processing, encryption, input/output (I/O) interfacing with peripheral devices, floating point arithmetic, string processing, etc.

Memory 204 may be any electronic, magnetic, optical, or other physical storage device that contains or stores executable instructions. Thus, memory 204 may be, for example, Random Access Memory (RAM), Read Only Memory (ROM), an Electrically Erasable Programmable Read-Only Memory (EEPROM), a storage drive, a Compact Disc Read Only Memory (CD-ROM), and the like. The computer may also include a network interface coupled to the input/output interface.

Figure 3:
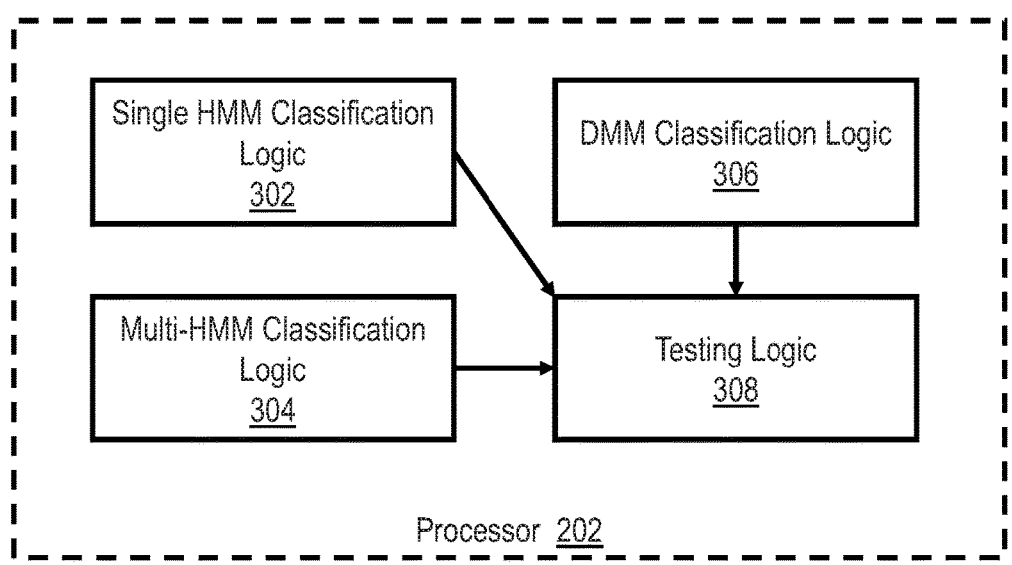
FIG. 3 shows an illustrative block diagram of a processor of a computer in a movement recognition system utilizing an inertial sensor and a depth sensor in accordance with various embodiments.

FIG. 3 shows an illustrative block diagram of processor 202 in accordance with various embodiments. Processor 202 may include single HMM classification logic 302, multi-HMM classification logic 304, DMM classification logic 306, and testing logic 308. In an embodiment, single HMM classification logic 302 receives the signals representative of the inertial measurements of object 104 from inertial sensor 106 and the signals representative of the measured shape of object 104 from depth sensor 108. Because the sampling rates of the signals from the inertial sensor 106 and the depth sensor 108 may be different (e.g., the inertial sensor 106 may have a sampling rate of 200 Hz while the depth sensor 108 may have a sampling rate of 30 Hz), the data from the inertial sensor 106 and/or depth sensor 108 may be down-sampled by single HMM classification logic 302 such that the sampling frequencies match. Furthermore, to reduce jitter in the two signals, a moving average window may be utilized.

Single HMM classification logic 302 may be configured to determine a type of movement of object 104 (i.e., classify a movement) utilizing the signals from both the inertial sensor 106 and the depth sensor 108 by utilizing a HMM classifier. For example, single HMM classification logic 302 may be configured to determine a type of hand gesture (e.g., waving, hammering, punching, circle movement, etc.) utilizing the signals from both the inertial sensor 106 and the depth sensor 108 by utilizing a HMM classifier.

The HMM classifier model characterizes a state transfer probability distribution A and observation (the received signals from the inertial sensor 106 and the depth sensor 108) probability distribution B. Given an initial state matrix $\pi$, an HMM is described by the triplet $\lambda=\{\pi,A,B\}$. If a random sequence of signals $O=\{O_1, O_2, \ldots, O_T\}$ is observed; $V=\{v_1, v_2, \ldots, v_T\}$ denotes all possible outcomes, $S=\{S_1, S_2, \ldots, S_T\}$ denotes all HMM states, and $q_t$ denotes the state at time t, where T indicates the number of time samples. The HMM probabilities are:

$$\pi=\{p_i=P(Q_1=S_i)\}, 1 \leq i \leq M \quad (1)$$

$$A=\{a_{ij}=P(q_t=S_j|q_{t-1}=S_i)\}, 1 \leq i,j \leq M \quad (2)$$

$$B=\{b_j(k)=P(O_t=v_k|q_t=S_j)\}, 1 \leq j \leq M, 1 \leq k \leq T \quad (3)$$

where:

$$\Sigma_{i=1}^M \pi_i=1, \Sigma_{j=1}^M a_{ij}=1, \text{ and } \Sigma_{k=1}^T b_j(k)=1 \quad (4)$$

Figure 4:
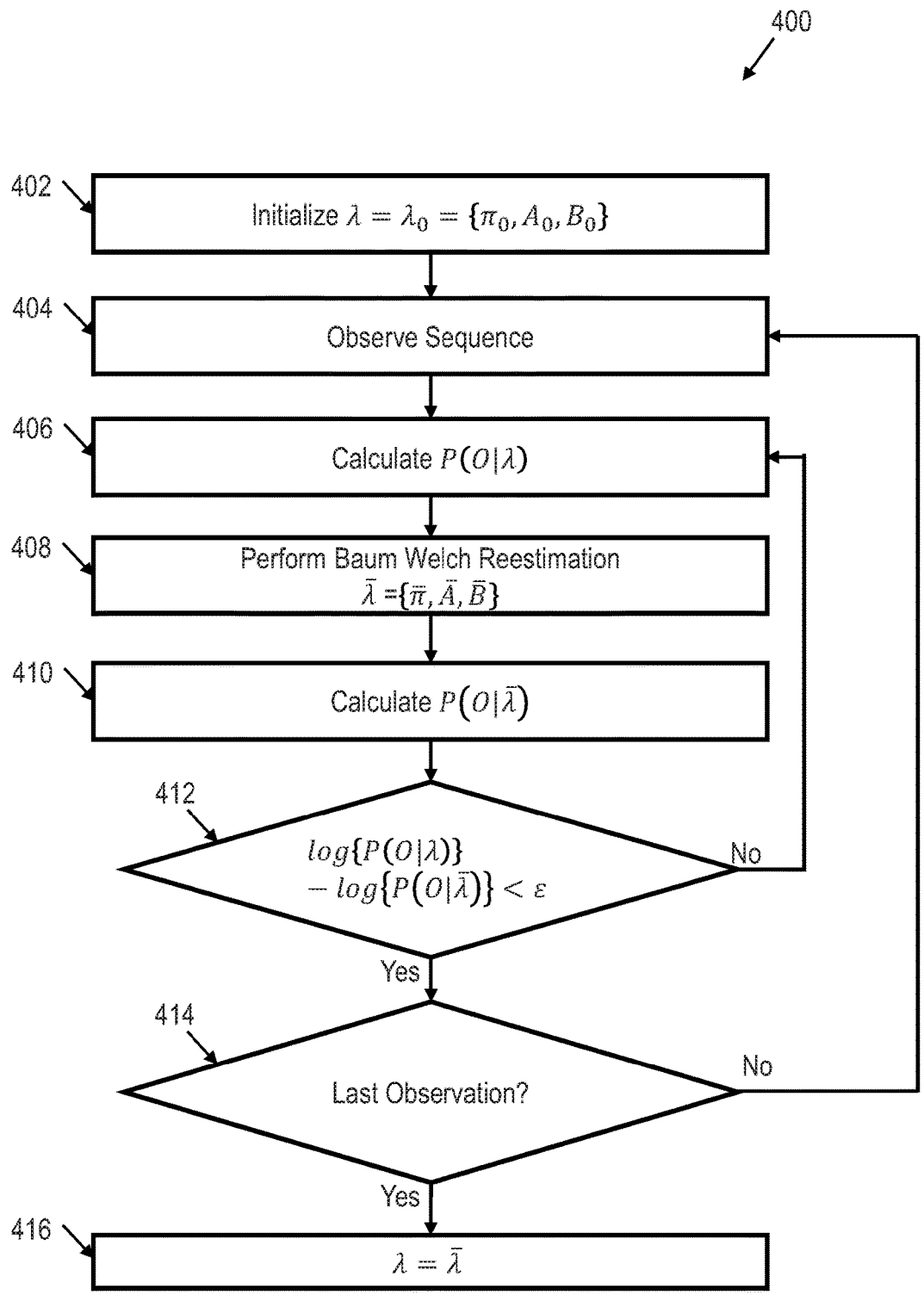
FIG. 4 shows an illustrative flow diagram of a method for HMM training in accordance with various embodiments.

Single HMM classification logic 302 may train the HMM so as to recognize particular types of movement for the object 104. For example, single HMM classification logic 302 may train a plurality of HMMs to each be able to recognize a single type of movement (e.g., each HMM is trained to recognize one of multiple gestures made by object 104). FIG. 4 shows an illustrative flow diagram of a method 400 for HMM training that may be performed by single HMM classification logic 302 in accordance with various embodiments. Though depicted sequentially as a matter of convenience, at least some of the actions shown can be performed in a different order and/or performed in parallel. Additionally, some embodiments may perform only some of the actions shown.

In block 402, the parameters discussed in equations (1)-(4) are initialized such that $\lambda=\lambda_0=\{\pi_0,A_0,B_0\}$. Matrix A controls the transitions in the HMM. To initialize matrix A, all of the nonadjacent probabilities in the matrix are zeroed out, thus, limiting the state transitions to the sequence of adjacent states representing the type of movement being trained. In other words, state transitions are constrained to occur from left-to-right and between two adjacent states. Hence, the initial transition matrix A is:

$$A = \begin{bmatrix} 0.5 & 0.5 & 0 & 0 & 0 \\ 0 & 0.5 & 0.5 & 0 & 0 \\ 0 & 0 & 0.5 & 0.5 & 0 \\ 0 & 0 & 0 & 0.5 & 0.5 \\ 0 & 0 & 0 & 0 & 1 \end{bmatrix} \quad (5)$$

In block 404, an observation sequence of the particular type of movement being trained is determined. In block 406, the probability of the observation sequence is calculated. If, the observation sequence is $O=\{O_1, O_2, \ldots, O_T\}$ of the particular type of movement being trained and $Q=\{q_1, q_2, \ldots, q_T\}$ is the corresponding state sequence, then the probability of the observation sequence calculated in block 406 is $(O|Q,\lambda)\Pi_{t=1}^T P(O_t|q_t,\lambda)$.

In block 408, a Baum Welch reestimation of the probability sequence is performed to update the HMM being trained. According to the Baum Welch algorithm, the probability $P(O|\lambda)\pi_{q_1}a_{q_1q_2}a_{q_2q_3}a_{q_3q_4} \ldots a_{q_{T-1}q_T}$ is calculated to update $\lambda$. Because $P(O, Q|\lambda)=P(O|Q,\lambda)P(Q,\lambda)$, $P(O|\lambda)$ $\Sigma_Q P(O|Q,\lambda)P(Q,\lambda)$ $\Sigma_{q_1,q_2,\ldots,q_T} \pi_{q_1}(O_1)a_{q_1q_2}b_{q_2}(O_2) \ldots a_{q_{T-1}q_T}b_{q_T}(O_T) \quad (6)$ To update the current model $\lambda=\{\pi,A,B\}$, the updated model is $\bar{\lambda}=\{\bar{\pi},\bar{A},\bar{B}\}$ and is calculated in block 410. To estimate $\bar{\lambda}=\{\bar{\pi},\bar{A},\bar{B}\}$, the probability of the joint event that $O_1, O_2, \ldots, O_T$ is observed is $\alpha_T(i)$. Thus, $\alpha_T(i)=P(O_1, O_2, \ldots, O_T, q_T=S_i|\lambda)$. Similarly, $\beta_T(i)=P(O_{t+1}, O_{t+2}, \ldots, O_T, q_T=S_i|\lambda)$. The probability of being in state $S_i$ at time t and state $S_j$ at time t+1 is thus given by $$\xi_t(i,j)P(q_t \: S_i, q_{t+1} \: S_j | O, \lambda)\frac{\alpha_t(i)a_{ij}b_j(O_{t+1})\beta_{t+1}(j)}{P(O|\lambda)} \quad (7)$$

If $\gamma_t(i)$ is the probability of being in state $S_i$ at time t, then $\gamma_t(i) \: \Sigma_{j=1}^N \xi_t(i,j), \bar{\lambda} \: \{\bar{\pi},\bar{A},\bar{B}\}$ where $$\bar{\pi}_i \: \gamma_t(i) \quad (8)$$

$$\bar{a}_{ij} = \frac{\sum_{t=1}^{T-1} \xi_t(i,j)}{\sum_{t=1}^{T-1} \gamma_t(i)} \quad (9)$$

$$\bar{b}_j(k) = \frac{\sum_{t=1,O_t=v_k}^{T-1} \gamma_t(j)}{\sum_{t=1}^{T-1} \gamma_t(i)} \quad (10)$$

Because there is a very small threshold value (e.g., $\varepsilon=10^{-6}$) the training may be terminated when $\log\{P(O|\lambda)\}-\log\{P(O|\bar{\lambda})\}<\varepsilon$. Therefore, in block 412, a determination is made of whether $\log\{P(O|\lambda)\}-\log\{P(O|\bar{\lambda})\}<\varepsilon$. If $\log\{P$ (O|λ)}−log{P(O|λ̄)} is not less than ε, then the method 400 continues in block 406 with calculating P(O|λ). However, if log{P(O|λ)}−log{P(O|λ̄)} is less than ε, then the method 400 continues in block 414 with determining whether any additional observations are needed to train the HMM for the particular type of movement. If it is determined that this is not the last observation, then the method 400 continues in 404 with observing an additional sequence of the particular type of movement being trained. However, if it is determined that this is the last observation, then the training of the HMM is complete and λ=λ̄.

Figure 5:
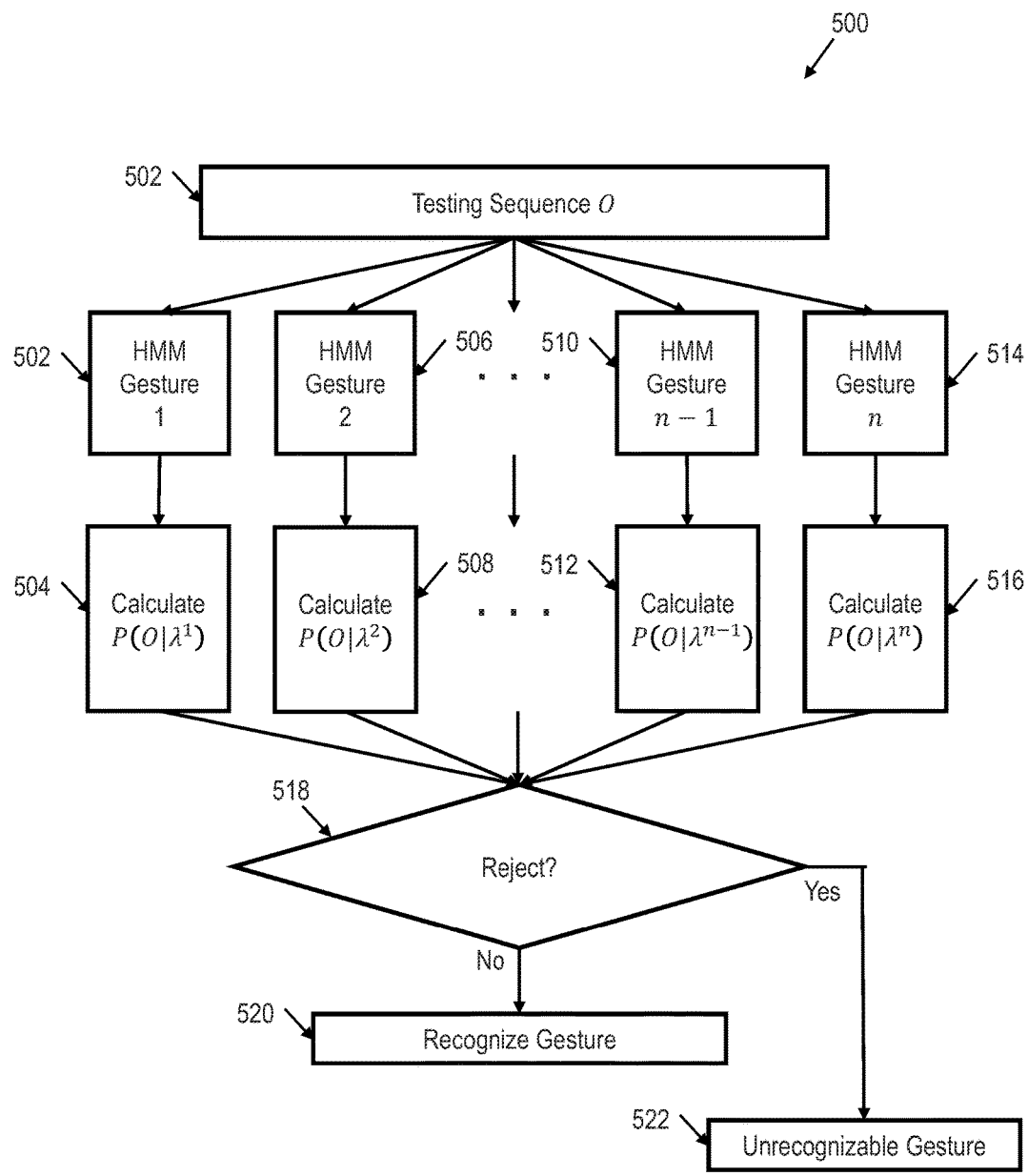
FIG. 5 shows an illustrative flow diagram of a method for HMM testing and/or movement recognition utilizing single HMM classification in accordance with various embodiments.

Once each of the HMMs are trained for their respective particular type of movement, single HMM classification logic 302 may make a determination of the type of movement of object 104. FIG. 5 shows an illustrative flow diagram of a method 500 for HMM testing and/or movement recognition that may be performed by single HMM classification logic 302 in accordance with various embodiments. Though depicted sequentially as a matter of convenience, at least some of the actions shown can be performed in a different order and/or performed in parallel. Additionally, some embodiments may perform only some of the actions shown.

The method 500 begins in block 502 with receiving, by the single HMM classification logic 502, a testing sequence and/or an observation sequence O. In other words, the single HMM classification logic 502 receives the signals generated by the inertial sensor 106 and the depth sensor 108 due to the movement of object 104. For each of the trained HMMs 502, 506, 510, 514 (e.g., a trained HMM for gesture 1, a trained HMM for gesture 2, etc.), the likelihood of probability P(O|λ) is calculated in blocks 504, 508, 512, 516 resulting in n likelihood of probabilities where n is the number of types of movement that are trained.

In block 518, a determination is made as to whether all of the calculated likelihood of probabilities should be rejected. For example, a high confidence interval (e.g., 95%) may be applied to the n calculated likelihood of probabilities. If μ represents the mean and σ represents the variance of the n calculated likelihood of probabilities, then to meet the 95% confidence interval, at least one of the n likelihood of probabilities must be larger than $$\mu + 1.96 \frac{\sigma}{\sqrt{n}}.$$

While a commence interval of 95% is shown in this example, other confidence intervals may be utilized in a similar manner. If none of the n calculated likelihood of probabilities meet the selected confidence interval, the sequence is rejected and the type of movement is unrecognizable in block 522. However, if any of the n calculated likelihood of probabilities meets the selected confidence interval, the type of movement corresponding to the trained HMM 502, 506, 510, 514 having the highest likelihood of probability is selected as the type of movement.

Returning to FIG. 3, processor 202 may also include multi-HMM classification logic 304. In an embodiment, like single HMM classification logic 302, multi-HMM classification logic 304 receives the signals representative of the inertial measurements of object 104 from inertial sensor 106 and the signals representative of the measured shape of object 104 from depth sensor 108. In alternative embodiments, only multi-HMM classification logic 304 receives the signals representative of the inertial measurements of object 104 from inertial sensor 106 and the signals representative of the measured shape of object 104 from depth sensor 108. Because the sampling rates of the signals from the inertial sensor 106 and the depth sensor 108 may be different (e.g., the inertial sensor 106 may have a sampling rate of 200 Hz while the depth sensor 108 may have a sampling rate of 30 Hz), the data from the inertial sensor 106 and/or depth sensor 108 may be down-sampled by multi-HMM classification logic 304 such that the sampling frequencies match. Furthermore, to reduce jitter in the two signals, a moving average window may be utilized.

Multi-HMM classification logic 304 may be configured to determine a type of movement of object 104 (i.e., classify a movement) utilizing the signals from both the inertial sensor 106 and the depth sensor 108 by utilizing multiple HMM classifiers. Thus, multi-HMM classification logic 302 may be configured to determine a type of hand gesture (e.g., waving, hammering, punching, circle, etc.) utilizing the signals from both the inertial sensor 106 and the depth sensor 108 by utilizing multiple HMM classifiers.

Figure 6:
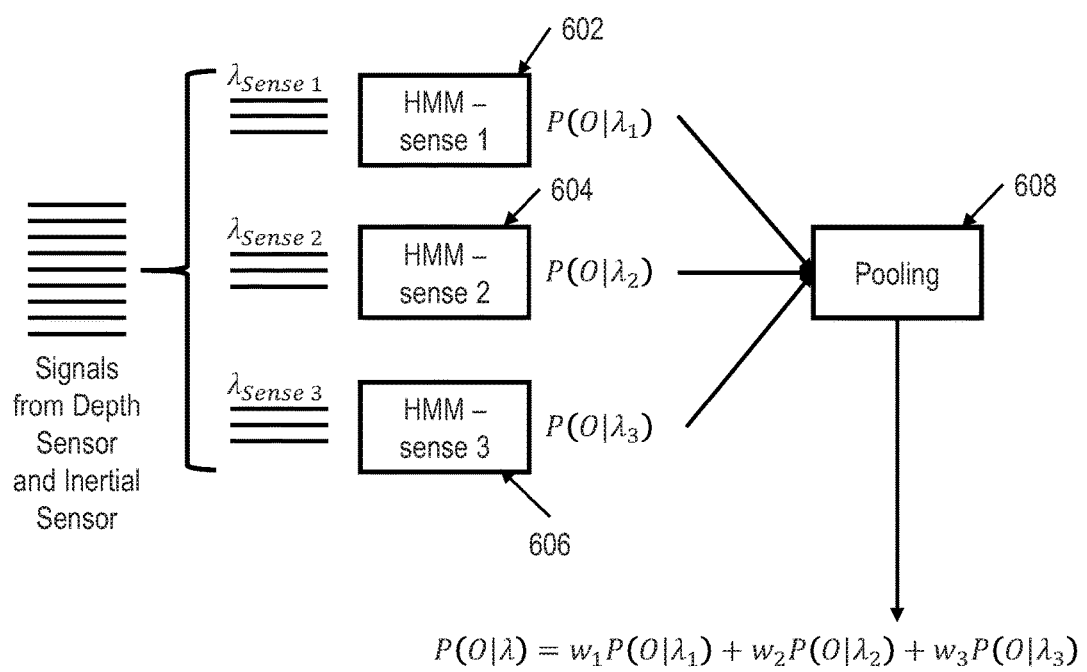
FIG. 6 shows an illustrative framework for HMM testing and/or movement recognition utilizing multi-HMM classification in accordance with various embodiments.

FIG. 6 shows an illustrative framework for HMM testing and/or movement recognition utilizing multi-HMM classification logic 304 in accordance with various embodiments. Though depicted sequentially as a matter of convenience, at least some of the actions shown can be performed in a different order and/or performed in parallel. Additionally, some embodiments may perform only some of the actions shown.

As shown in FIG. 6, all of the signals from the inertial sensor 106 and depth sensor 108 are received by the multi-HMM classification logic 304. However, the inertial sensor 106 and depth sensor 108 may provide different types of data (e.g., the inertial sensor 106 may provide acceleration data of object 104 while the depth sensor provides shape (and/or depth) data of object 104). Furthermore, inertial sensor 106 may itself provide multiple types of data (e.g., acceleration data and angular rate data). Therefore, each type of data may be fed into its own HMM classifier 602-606, each classifier generating its own likelihood of probability. First, each HMM classifier 602-606 may be trained for that specific type of data in a similar manner as shown in FIG. 4. Thus, HMM classifier 602 may be trained to recognize different types of movements for one specific type of data (e.g., acceleration). Similarly, HMM classifier 604 may be trained to recognize the same types of movements as HMM classifier 602, only for a different type of data (e.g., angular rate) than HMM classifier 602 while HMM classifier 606 may be trained to recognize the same types of movements as HMM classifiers 602 and 604, but only utilizing a different type of data (e.g., depth data). Thus, in this example, a plurality of HMMs is trained to recognize a specific type of movement (e.g., hand gesture) utilizing only acceleration data, while two other pluralities of HMMs are trained to recognize the same types of movement utilizing angular rate data and depth data respectively.

Similar to the single HMM classification logic 302, multi-HMM classification logic 304 may calculate the likelihood of probabilities for each of the HMM classifiers 602-606. In block 608, the likelihood of probabilities from each of the HMM classifiers 602-606 for each of the specific types of movement trained then may be multiplied by a weight and pooled together by adding the individually weighted likelihood of probabilities into an overall probability of all of the input signals as:

$$P(O|\lambda) = w_1 P(O|\lambda_1) + w_2 P(O|\lambda_2) + w_3 P(O|^2|\lambda_3) \qquad (11)$$

In the example shown in FIG. 6, three HMM classifiers are utilized which may be denoted as $\lambda_{sense(1)0} = \{\pi_{sense(1)0}, A_{sense(1)0}, B_{sense(1)0}\}$, $\lambda_{sense(2)0} = \{\pi_{sense(2)0}, A_{sense(2)0}, B_{(sense(2)0}\}$, $\lambda_{sense(3)0} = \{\pi_{sense(3)0}, A_{sense(3)0}, B_{(sense\ (3)0}\}$ representing each of the senses sensed by the inertial sensor 106 and depth sensor 108. The parameters of these models are then estimated according to the Baum-Welch algorithm as discussed above. During movement recognition, the overall likelihood of probability for a specific type of movement $P(O|\lambda)$ is computed based on the three likelihood of probabilities $P(O|\lambda_1), P(O|\lambda_2), P(O|\lambda_3)$. The type of movement with the maximum average of the three weighted likelihood of probabilities $w_1 P(O|\lambda_1), w_2 P(O|\lambda_2), w_3 P(O|\lambda_3)$ then may be selected as the type of movement of the object 104. One advantage of utilizing the multi-HMM classification logic 304 over the single HMM classification logic 302 is that the differences between the probability of likelihoods is diminished and/or the discriminatory power is increased.

Returning to FIG. 3, processor 202 may also include DMM classification logic 306. In an embodiment, like single HMM classification logic 302 and multi-HMM classification logic 304, DMM classification logic 306 receives the signals representative of the inertial measurements of object 104 from inertial sensor 106 and the signals representative of the measured shape of object 104 from depth sensor 108. In alternative embodiments, only DMM classification logic 306 receives the signals representative of the inertial measurements of object 104 from inertial sensor 106 and the signals representative of the measured shape of object 104 from depth sensor 108. Because the sampling rates of the signals from the inertial sensor 106 and the depth sensor 108 may be different (e.g., the inertial sensor 106 may have a sampling rate of 200 Hz while the depth sensor 108 may have a sampling rate of 30 Hz), the data from the inertial sensor 106 and/or depth sensor 108 may be down-sampled by DMM classification logic 306 such that the sampling frequencies match. Furthermore, to reduce jitter in the two signals, a moving average window may be utilized.

DMM classification logic 306 may be configured to determine a type of movement of object 104 (i.e., classify a movement) utilizing the signals from both the inertial sensor 106 and the depth sensor 108. Thus, DMM classification logic 306 may be configured to determine a type of hand gesture (e.g., waving, hammering, punching, circle, etc.) utilizing the signals from both the inertial sensor 106 and the depth sensor 108.

More particularly, DMM classification logic 306 may utilize both feature-level and decision-level fusion of the signals from the inertial sensor 106 and the depth sensor 108 to recognize (classify) the type of movement of object 104. First, a depth feature may be extracted from the signal representative of the measured shape by DMM classification logic 306. Before performing depth image projections, the foreground that contains the moving object is extracted. Any dynamic background subtraction algorithms may be utilized to extract the foreground including background modeling techniques or spatio-temporal filtering to extract the spatio-temporal interest points corresponding to an action of object 104. To make this task computationally efficient, the mean depth value $\mu$ for each $M_0 \times N_0$ depth image may be computed and the foreground region may be selected according to:

$$d_{a,b} = \begin{cases} d_{a,b}, & \text{if } |d_{a,b} - \mu| \le \varepsilon \\ 0, & \text{otherwise} \end{cases} \quad (12)$$

where $d_{a,b}(a=1, 2, \ldots, M_0, b=1, 2, \ldots, N_0)$ is the depth value (indicating the distance between the depth sensor 108 and the object 104) of the pixel in the ath row and bth column of the depth image, $\varepsilon$ is a threshold for the depth value with a unit of mm. Based on the Berkeley multi-modal human database (MHAD), the foreground may be extracted by setting $\varepsilon \in [800, 900]$. In alternative embodiments, other settings may be utilized to extract the foreground. For example, if object 104 is a human body, the position of the joints of the human's skeleton may determine the depth range for foreground extraction.

Each foreground extracted depth image then may be used to generate three 2D projected maps corresponding to the front, side, and top views of the shape detected by the depth sensor 108, denoted by $map_v$ where $v \in \{f, s, t\}$. For a point (x,y,z) in the depth image with z denoting the depth value in a right-handed coordinate system, the pixel values in the three projected maps ($map_f$, $map_s$, $map_t$) are indicated by z, x, and y, respectively. For each projection view, the absolute difference between two consecutive projected maps may be accumulated through an entire depth video sequence forming a DMM. Specifically, for each projected map, the motion energy is calculated as the absolute difference between two consecutive maps. For a depth video sequence with N frames, the depth motion map $DMM_v$ is obtained by stacking the motion energy across an entire depth video sequence as follows:

$$DMM_v = \Sigma_{q=1}^{N-1} |map_v^{q+1} - map_v^q| \quad (13)$$

where q represents the frame index, and $map_v^q$ the projected map of the qth frame for the projection view v. In some embodiments, to keep the computational cost low, only the DMM generated from the front view, i.e. $DMM_f$, is used as the depth feature; however, in alternative embodiments additional and/or different DMMs may be utilized. A bounding box may be set to extract the non-zero region as the region of interest (ROI) in each $DMM_f$. The ROI extracted $DMM_f$ is denoted as $DMM'_f$. Since $DMM'_f$ of different video sequences may have different sizes, bicubic interpolation may be used to resize all $DMM'_f$ to a fixed size in order to reduce the intra-class variations.

Next, an inertial feature may be extracted from the signal representative of the measured unit of inertia by DMM classification logic 306. Each inertia sensor 106 sequence (e.g., accelerometer sequence) may be partitioned into $N_s$ temporal windows. Statistical measures, including mean, variance, standard deviation, and root mean square, may be computationally efficient and useful for capturing structural patterns in motion data. Therefore, these four measures may be computed along each direction in each temporal window. In alternative embodiments, only some of these measures may be computed. For each inertial sensor 106, concatenating all measures from $N_s$ windows results in a column feature vector of dimensionality $4 \times 3 \times N_s$.

DMM classification logic 306 then may perform feature-level fusion of the data from the inertial sensor 106 and the depth sensor 108. If $U = \{u_l\}_{l=1}^n$ in $\mathbb{R}^{d_1}$ ($d_1$-dimensional feature space) and $V = \{v_l\}_{l=1}^n$ in $\mathbb{R}^{d_2}$ ($d_2$-dimensional feature space), they represent the feature sets generated, respectively, from the depth sensor 108 and the inertial sensor 106 for n training action samples. Column vectors $u_l$ and $v_l$ may be normalized to have the unit length. Then, the fused feature set may be represented by $F = \{f_l\}_{l=1}^n$ in $\mathbb{R}^{d_1+d_2}$ with each column vector being $f_l = [u_l^T, v_l^T]^T$. The fused feature set then may be fed into a classifier such as a sparse representation classifier (SRC), a collaborative representation classifier (CRC), and/or and HMM classifier for classification of the type of movement.

SRC may classify measured movements of object 104 into a type of movement. The idea is to represent a test sample according to a small number of atoms sparsely chosen out of an over-complete dictionary formed by all available training samples. Considering C distinct classes and a matrix $X=\{x_i\}_{i=1}^n \in \mathbb{R}^{d \times n}$ formed by n dimensional training samples arranged column-wise to form the over-complete dictionary. For a test sample $y \in \mathbb{R}^d$, y may be expressed as a sparse representation in terms of matrix X as follows:

$$y = X\alpha \qquad (14)$$

where $\alpha$ is a n×1 vector of coefficients corresponding to all training samples from the C classes. $\alpha$ cannot directly be solved for because equation (14) is typically underdetermined. However, a solution can be obtained by solving the following $l_1$-regularized minimization problem:

$$\hat{\alpha} = \underset{\alpha}{\arg\min} \|y - X\alpha\|_2^2 + \lambda \|\alpha\|_1. \qquad (15)$$

here $\lambda$ is a regularization parameter which balances the influence of the residual and the sparsity term. According to the class labels of the training samples, $\hat{\alpha}$ can be partitioned into C subsets $\hat{\alpha}=[\hat{\alpha}_1, \hat{\alpha}_2, \ldots, \hat{\alpha}_C]$ with $\hat{\alpha}_j$ (j∈1, 2, . . . , C) denoting the subset of the coefficients associated with the training samples from the jth class (i.e. $X_j$). After coefficient partitioning, a class-specific representation, $\tilde{y}_j$, may be computed as follows:

$$\text{i } \tilde{y} = X_j \hat{\alpha}_j \qquad (16)$$

The class label of y can be identified by comparing the closeness between y and $\tilde{y}_j$ via:

$$\text{class}(y) = \underset{j \in \{1, 2, \ldots, C\}}{\arg\min} r_j(y) \qquad (17)$$

where $r_j(y) = \|y - \tilde{y}\|_2$ indicates the residual error. Thus the SRC Algorithm may be expressed as:

Input: Training samples $\{x_i\}_{i=1}^n \in \mathbb{R}^{d \times n}$, class label $\omega_i$ (used for class partitioning), test sample $y \in \mathbb{R}^d$, $\lambda$, C (number of classes) Calculate $\hat{\alpha}$ via $l_1$-minimization of equation (15)
for all j∈{1, 2, . . . , C} do
  Partition $X_j \alpha_j$
  Calculate $r_j(y) = \|y - \tilde{y}\|_2 = \|y - X_j \hat{\alpha}\|_2$
end for
Decide class(y) via equation (17)
Output: class(y)

CRC may also classify measured movements of object 104 into a type of movement. CRC is the collaborative representation (i.e., the use of all the training samples as a dictionary, but not the $l_1$-norm sparsity constraint) to improve classification accuracy of a measured movement. The $l_2$-regularization generates comparable results but with significantly lower computational complexity. The CRC swaps the $l_1$ penalty in equation (15) with an $l_2$ penalty, i.e.

$$\hat{\alpha} = \underset{\alpha}{\arg\min} \|y - X\alpha\|_2^2 + \theta \|\alpha\|_2^2 \qquad (18)$$

The $l_2$-regularized minimization of equation (18) is in the form of the Tikhonov regularization, thus, leading to the following closed form solution:

$$\hat{\alpha} = (X^T X + \theta I)^{-1} X^T y \qquad (19)$$

where $I \in \mathbb{R}^{n \times n}$ denotes an identity matrix. The general form of the Tikhonov regularization involves a Tikhonov regularization matrix $\Gamma$. As a result, equation (18) can be expressed as:

$$\hat{\alpha} = \underset{\alpha}{\arg\min} \|y - X\alpha\|_2^2 + \theta \|\Gamma \alpha\|_2^2 \qquad (20)$$

The term $\Gamma$ allows the imposition of prior knowledge on the solution, where the training samples that are most dissimilar from a test sample are given less weight than the training samples that are most similar. Specifically, the following diagonal matrix $\Gamma \in \mathbb{R}^{n \times n}$ is considered:

$$\Gamma = \begin{bmatrix} \|y - x_1\|_2 & \cdots & 0 \\ \vdots & \ddots & \vdots \\ 0 & \cdots & \|y - x_n\|_2 \end{bmatrix} \qquad (21)$$

The coefficient vector $\hat{\alpha}$ then may be calculated as follows:

$$\hat{\alpha} = (X^T X + \theta \Gamma^T \Gamma)^{-1} X^T y \qquad (22)$$

DMM classification logic 306 may also perform decision-level fusion of the data from the inertial sensor 106 and the depth sensor 108. For C action classes and a test sample y, the frame of discernment is given by $\Theta = \{H_1, H_2, \ldots, H_C\}$, where $H_j$: class(y)=j, j∈{1, 2, . . . , C}. The classification decision of the classifiers SRC or CRC is based on the residual error with respect to class j, $r_j(y)$ using equation (17). Each class-specific representation $\tilde{y}_j$ and its corresponding class label j constitute a distinct item of evidence regarding the class membership of y. If y is close to $\tilde{y}_j$ according to the Euclidean distance, for small $r_j(y)$, it is most likely that $H_j$ is true. If $r_j(y)$ is large, the class of $\tilde{y}_j$ will provide little or no information about the class of y. This may be represented by a basic probability assignment (BPA) over $\Theta$ defined as follows:

$$m(H_j|\tilde{y}_j) = \beta \phi_j(r_j(y)) \qquad (23)$$

$$m(\Theta|\tilde{y}_j) = 1 - \beta \phi_j(r_j(y)) \qquad (24)$$

$$m(D|\tilde{y}_j) = 0, \forall D \in 2^\Theta \setminus \{\Theta, H_j\} \qquad (25)$$

where $\beta$ is a parameter such that $0 < \beta < 1$, and $\phi_j$ is a decreasing function satisfying these two conditions:

$$\phi_j(0) = 0 \qquad (26)$$

$$\lim_{r_j(y) \to \infty} \phi_j(r_j(y)) = 0 \qquad (27)$$

However, as there may exist many decreasing functions satisfying the two conditions listed in equations (26) and (27), the following $\phi_j$ may be chosen:

$$\phi_j(r_j(y)) = e^{-\gamma_j r_j(y)^2} \qquad (28)$$

with $\phi_j$ being a positive parameter associated with class j. To gain computational efficiency, $\gamma_j$ may be set to 1 which makes $\phi_j$ a Gaussian function:

$$\phi_j(r_j(y)) = e^{-r_j(y)^2} \qquad (29)$$

Since there are C class specific representations $\tilde{y}_j$s, the final belief regarding the class label of y may be obtained by combining the C BPAs using the Dempster's rule of combination. The resulting global BPA, $m_g$ is:

$$m_g(H_j) = \frac{1}{K_0}(1 - \{1 - \beta\phi_j(r_j(y))\})\prod_{p \neq j}\{1 - \beta\phi_j(r_j(y))\}, \quad (30)$$

$$p \in \{1, \ldots, C\}$$

$$m_g(\Theta) = \frac{1}{K_0}\prod_{j=1}^{C}\{1 - \beta\phi_j(r_j(y))\} \quad (31)$$

where $K_0$ is a normalization factor:

$$K_0 = \Sigma_{j=1}^{C}\Pi_{p \neq j}\{1-\beta\phi_j(r_j(y))\} + (1-C)\Pi_{j=1}^{C}\{1-\beta\phi_j(r_j(y))\} \quad (32)$$

To effectuate the decision-level fusion, SRC or CRC is first applied to the depth feature set U and inertial feature set V, respectively. Therefore, two corresponding global BPAs, $m_g$, 1 and $m_g$, 2, are generated. The combined BPA from $m_g$, 1 and $m_g$, 2 then may be obtained via the Dempster-Shafer Theory. The class label of a new test sample is determined by which corresponds to the maximum value of Bel($H_j$), (i.e. max(Bel($H_j$))).

Figure 7:
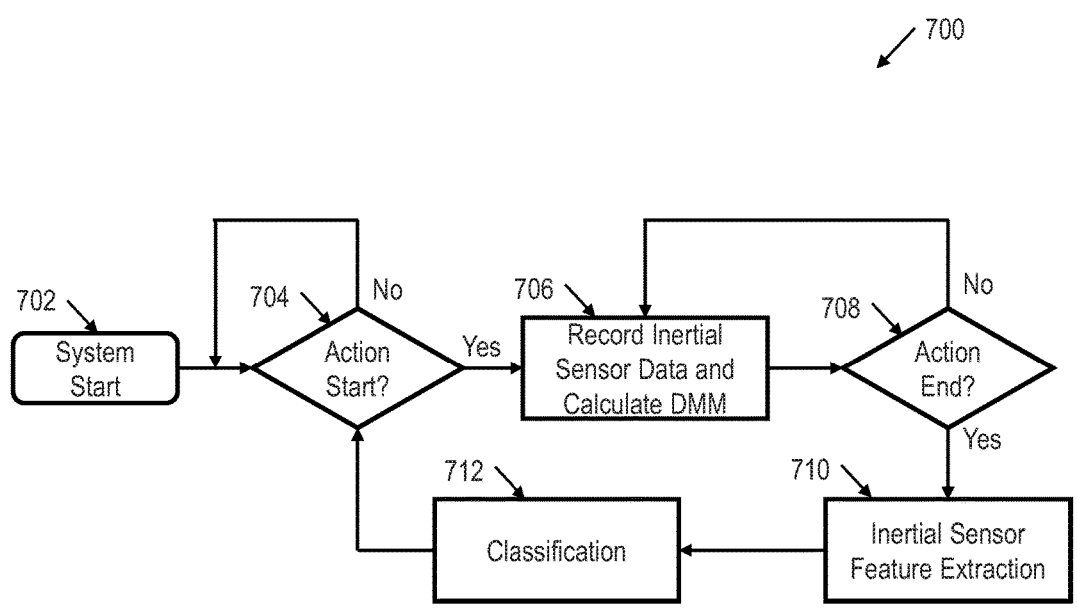
FIG. 7 shows an illustrative flow diagram of real time movement recognition utilizing a depth motion map (DMM) classification model in accordance with various embodiments.

FIG. 7 shows an illustrative flow diagram of a real time movement recognition method 700 utilizing DMM classification logic 306 in accordance with various embodiments. Though depicted sequentially as a matter of convenience, at least some of the actions shown can be performed in a different order and/or performed in parallel. Additionally, some embodiments may perform only some of the actions shown.

The method 700 begins in block 702 with starting the system. In block 704 a decision is made as to whether action and/or movement of the object 104 has begun. If not, the method 700 continues determining whether action and/or movement of the object 104 has begun until it does begin. If action and/or movement of the object 104 has begun, then the method 700 continues in block 706 with recording inertial sensor data and calculating the DMM as discussed above. The method 700 continues in block 708 with determining whether the action and/or movement of the object 104 has ended. If not, the method 700 continues in block 706 with further recording inertial sensor data and calculating the DMM as discussed above. However, if the action and/or movement of the object 104 has ended in block 708, then the method 700 continues in block 710 with extracting the inertial feature set from the signal representative of the measured first unit of inertia. In block 712, the method 712 continues with classifying and/or determining the type of movement of the object 104. The method continues in block 704 with determining whether another action and/or movement of the object 104 has begun. In this way, DMM classification logic 306 continually and in real time performs movement recognition.

Figure 8:
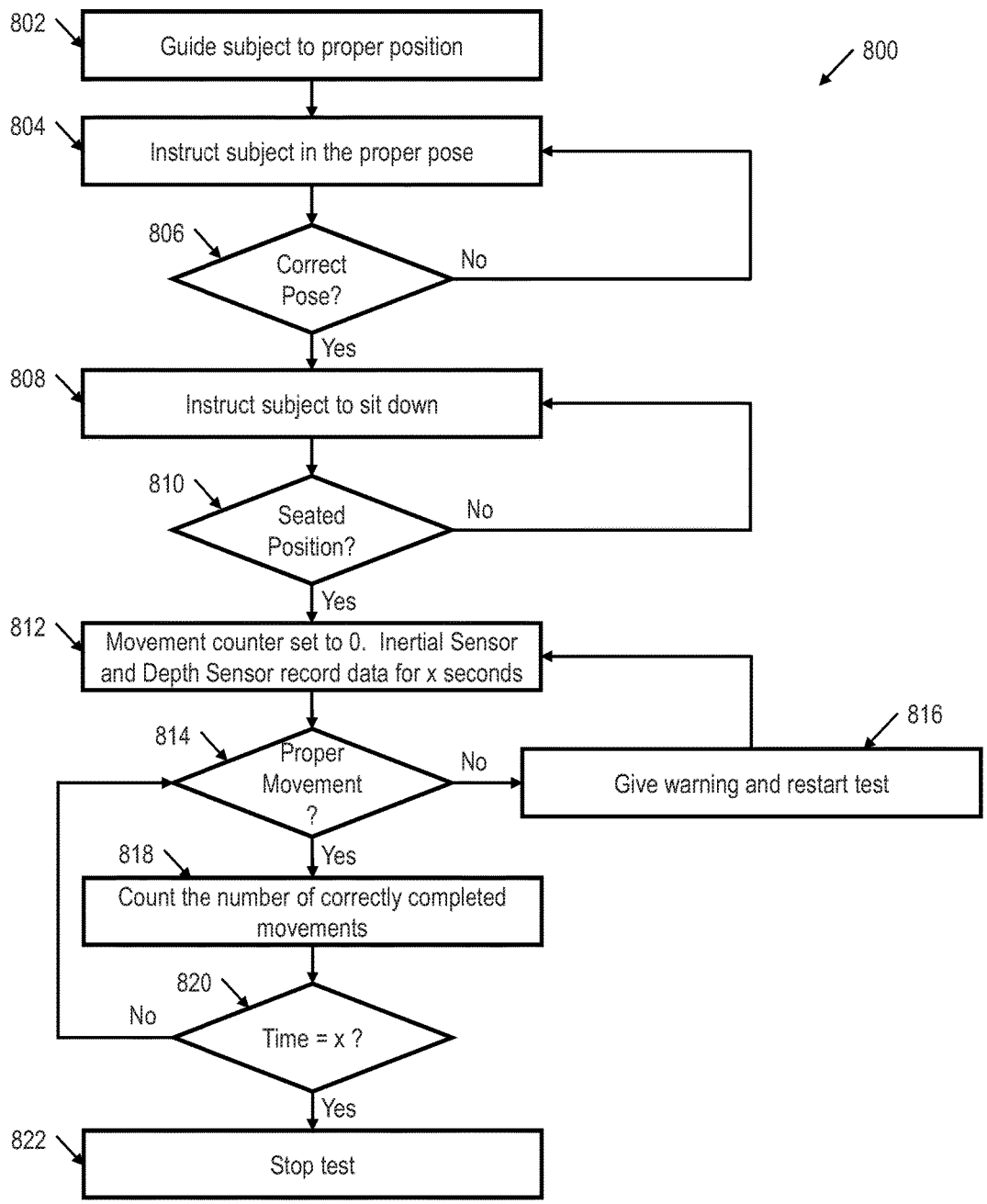
FIG. 8 shows an illustrative flow diagram of a method for conducting a fitness test utilizing a movement recognition system in accordance with various embodiments.

Returning to FIG. 3, processor 202 may also include testing logic 308. Testing logic may be configured to test and/or evaluate tests, utilizing the classifications and/or types of movements determined by single HMM classification logic 302, multi-HMM classification logic 304, and/or DMM classification logic 306. For example, FIG. 8 shows an illustrative flow diagram of a fitness test method 800 utilizing movement recognition system 100 that may be evaluated by testing logic 308 in accordance with various embodiments. Though depicted sequentially as a matter of convenience, at least some of the actions shown can be performed in a different order and/or performed in parallel. Additionally, some embodiments may perform only some of the actions shown.

The method 800 begins in block 802 with instructing and/or guiding a subject to position an object in a proper position. For example, the object may be a human, and the instructions provided to the human may be to properly position the human in the correct position to perform a fitness test. Similarly, in block 804, the method 800 continues with instructing the subject to pose the object in a proper position. Continuing the previous example, the subject may need to pose properly to perform the test. In block 804 a determination is made as to whether the object is posed properly. If the object is not posed properly, the method 800 continues in block 804 with again instructing the subject to pose the object in a proper position. However, if the subject is posed properly, then the method continues in block 808 with instructing the subject to sit down. In block 810, the method continues with determining whether the subject is in a seated position. If the subject is not in a seated position, the method 800 continues in block 808 with again instructing the subject to sit down. However, if the subject is in the seated position, then the method 800 continues in block 812 with setting the movement counter to 0 and causing the inertial sensor and depth sensor to record data for x seconds (e.g., for thirty seconds).

In block 814, utilizing the results from single HMM classification logic 302, multi-HMM classification logic 304, and/or DMM classification logic 306, the method 800 continues with determining whether the subject is performing the correct type of movements and/or movement classifications. This may be accomplished by comparing the classified movement type performed by the subject with a predefined intended movement type. If the subject is not performing the correct type of movements and/or movement classifications, then the method 800 continues in block 816 with giving a warning to the subject and restarting the test. The method then continues back in block 812 with setting the movement counter to 0. However, if in block 814 a determination is made that the subject is performing the correct type of movements and/or movement classifications, then the method 800 continues in block 818 with counting the number of correctly completed movements. In block 820, the method 800 continues with determining whether x seconds have been completed. If not, then the method continues in block 814 with determining whether the subject is properly completing the correct type of movements and/or movement classifications. However, if in block 820 a determination is made that x seconds have been completed, then the test stops in block 822. Method 800 is just one of many tests and/or applications that may be performed utilizing testing logic 308 and the movement recognition of single HMM classification logic 302, multi-HMM classification logic 304 and/or DMM classification logic 306.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

The invention claimed is:

1. A movement recognition system, comprising:
an inertial sensor coupled to an object and configured to measure a first unit of inertia of the object;

a depth sensor configured to measure a three dimensional shape of the object using projected light patterns and a camera; and a processor configured to receive a signal representative of the measured first unit of inertia from the inertial sensor and a signal representative of the measured shape from the depth sensor and to determine a type of movement of the object based on the measured first unit of inertia and the measured shape utilizing a classification model, wherein the processor is configured to:
    compare the type of movement with a predefined intended movement type:
    issue a warning in response to the type of movement not matching the predefined intended movement type; and
    count a number of correctly completed movements in response to the type of movement matching the predefined intended movement type.

2. The movement recognition system of claim 1, wherein the processor is further configured to determine the type of movement of the object by:
    training a plurality of Hidden Markov models (HMMs), each of the plurality of HMMs corresponding to a particular type of movement;
    calculating a likelihood of probability for each of the plurality of trained HMMs based on the signal representative of the measured first unit of inertia and the signal representative of the measured shape; and
    selecting the type of movement corresponding to the trained HMM having the highest likelihood of probability.

3. The movement recognition system of claim 2, wherein the processor is further configured to train each of the plurality of HMMs by:
    initializing HMM parameters including an HMM probability and a transition matrix;
    determining an observation sequence of the particular type of movement for the particular HMM being trained;
    calculating a probability of the observation sequence; and
    performing a Baum Welch reestimation of the probability of the observation sequence to update the HMM.

4. The movement recognition system of claim 1, wherein:
    the inertial sensor is further configured to measure a second unit of inertia of the object; and
    the processor is further configured to receive a signal representative of the measured second unit of inertia from the inertial sensor and to determine the type of movement of the object based on the measured second unit of inertia.

5. The movement recognition system of claim 4, wherein the processor is configured to determine the type of movement of the object by:
    training:
        a first plurality of Hidden Markov models (HMMs), each of the first plurality of HMMs corresponding to a particular type of movement for the measured first unit of inertia;
        a second plurality of HMMs, each of the second plurality of HMMs corresponding to the particular type of movement for the measured second unit of inertia; and
        a third plurality of HMMs, each of the third plurality of HMMs corresponding to the particular type of movement for the measured shape;
    calculating:
        a first likelihood of probability for each of the first plurality of HMMs based on the signal representative of the measured first unit of inertia;
        a second likelihood of probability for each of the second plurality of HMMs based on the signal representative of the measured second unit of inertia; and
        a third likelihood of probability for each of the third plurality of HMMs based on the signal representative of the measured shape;
    pooling together the first, second, and third likelihood of probabilities to generate an overall probability for each of the first, second, and third pluralities of HMMs; and
    selecting the type of movement corresponding to the trained HMM having the highest overall probability.

6. The movement recognition system of claim 5, wherein the processor is further configured to pool the first, second, and third likelihood of probabilities by:
    multiplying the first likelihood of probability by a first weight to generate a weighted first likelihood of probability, the second likelihood of probability by a second weight to generate a weighted second likelihood of probability, and the third likelihood of probability by a third weight to generate a weighted third likelihood of probability; and
    adding the weighted first, weighted second, and weighted third likelihood of probabilities.

7. The movement recognition system of claim 1, the processor is further configured to determine the type of movement of the object by:
    extracting a depth feature set from the signal representative of the measured shape;
    extracting a inertial feature set from the signal representative of the measured first unit of inertia; and
    fusing the depth feature and the inertial feature at a decision-level.

8. The movement recognition system of claim 7, wherein the processor is further configured to extract the depth feature from the signal representative of the measured shape by:
    extracting a foreground containing the object from the signal representative of the measured shape utilizing a background subtraction algorithm to generate a foreground extracted depth image;
    generating three two dimensional projected maps corresponding to a front, view of the foreground extracted depth image; and
    accumulating a difference between two consecutive projected maps through an entire depth video sequence to generate a depth motion map (DMM).

9. The movement recognition system of claim 7, wherein the processor is further configured to fuse the depth feature and the inertial feature at a decision-level by:
    applying a sparse representation classifier (SRC) or collaborative representation classifier (CRC) to the extracted depth feature set and the extracted inertial feature set to generate a first and second basic probability assignments (BPAs) respectively;
    combining the first and second BPAs; and
    selecting the type of movement.

\* \* \* \* \*